C. G. MAYER.

Assignor of one-half to L. RASSIEUR.

REFRIGERATING APPARATUS.

No. 10,242. Reissued Nov. 14, 1882.

Attest.
Charles Pickles
William S. Sayers

Inventor:
Charles G. Mayer
By Knight Bros
Attorneys

THE NORRIS PETERS CO., WASHINGTON, D. C.

UNITED STATES PATENT OFFICE.

CHARLES G. MAYER, OF NAUVOO, ILLINOIS, ASSIGNOR OF ONE-HALF TO LEO RASSIEUR, OF ST. LOUIS, MISSOURI.

REFRIGERATING APPARATUS.

SPECIFICATION forming part of Reissued Letters Patent No. 10,242, dated November 14, 1882.

Original No. 256,350, dated April 11, 1882. Application for reissue filed June 26, 1882.

*To all whom it may concern:*

Be it known that I, CHARLES G. MAYER, of Nauvoo, Hancock county, Illinois, have invented a certain new and useful Improvement in Refrigerating Processes and Apparatuses, of which the following is a full, clear, and exact description, reference being had to the accompanying drawings, forming part of this specification, and in which—

Figure 1:
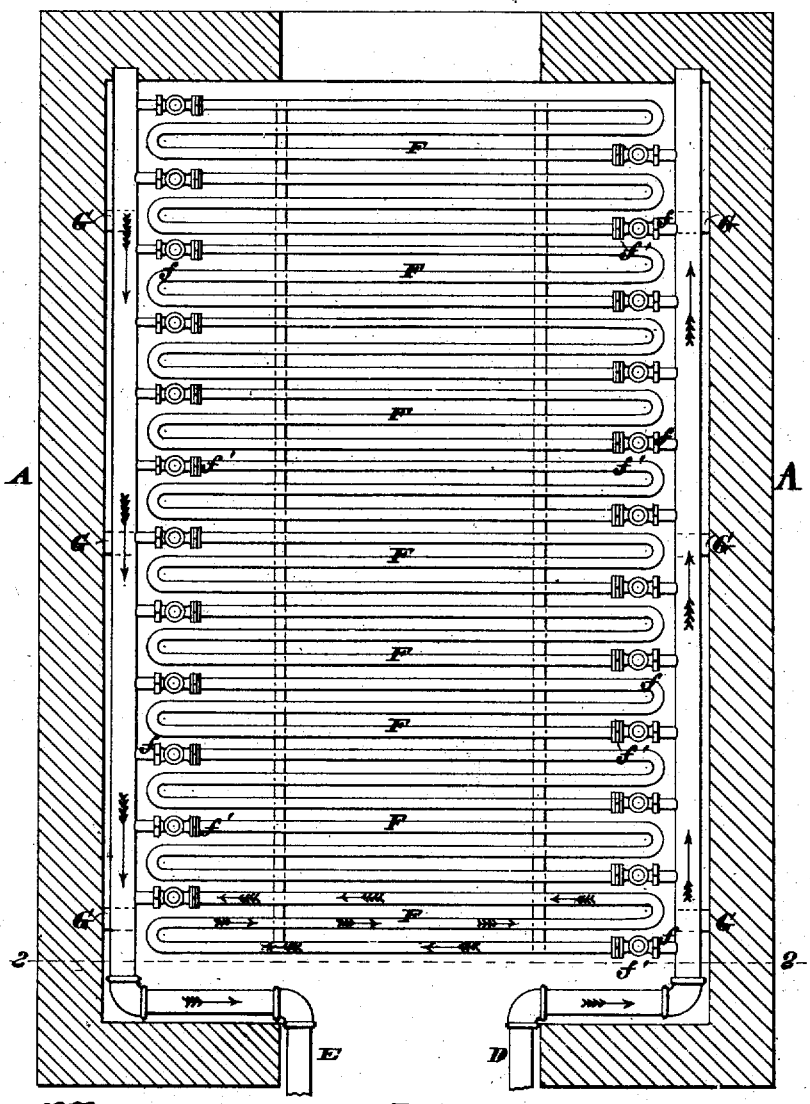
Figure 2:
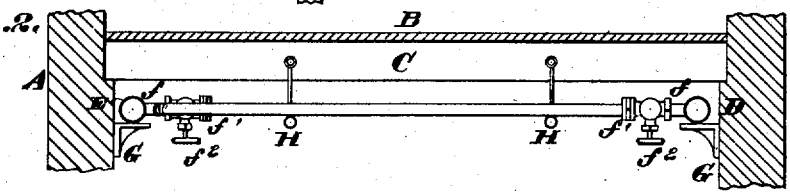

Figure 1 is a horizontal section of a room beneath the floor and above the pipe system. Fig. 2 is a vertical section on line 2 2, Fig. 1.

My invention relates to a process and apparatus for cooling rooms—used principally for brewery purposes—wherein a system of pipe-sections is employed through which cold brine is circulated to and from a cooling-tank.

A represents the walls of a room; B, the floor, and C the joist.

D represents a feed-pipe, and E a return-pipe.

The direction in which the cooling-brine flows is shown by arrows.

F represents sections of pipes connected by their opposite ends to the feed and return pipes respectively. Each section F preferably crosses the room three times, as shown, so that the brine entering one end of a section crosses the room three times, when it enters the return-pipe and is taken back to the cooling-tank.

It will thus be seen that there will be very little friction or back-pressure of the liquid to what there would were the cooling-pipes in one piece. Besides, if the pipes were in one piece, the brine would become heated from friction and from taking up heat in the pipe, and the greater portion of its work would be without effect.

The sections are connected to the main pipes by means of short lengths $f$ and couplings $f'$. There is a valve, $f^2$, located in each length $f$ for regulating the flow of brine, and for cutting off, when desired, all communications between any section and the main pipes. Should any section become stopped up so the brine cannot circulate through it, the two valves or cocks would be closed, when the sections could be taken down and cleaned out; but the circulation would be going on in the other pipes or sections, and as one section is but a small proportion of the whole the temperature of the room would not be materially changed by its disconnection.

The pipes are supported by brackets G, extending out from the walls of the room beneath the main pipes, and by rods H, hung from the ceiling (see Fig. 2) beneath the sections.

As a matter of course, the feed and return pipes may run through any number of rooms, and sections of cooling-pipes be connected with them in such rooms.

I claim as my invention—

1. The combination of feed and return pipes and removable connecting-sections, arranged substantially as and for the purpose set forth.

2. In combination with main pipes D and E, the sections F, removably connected to the lengths $f$ by couplings $f'$, which are provided with cocks $f^2$, substantially as and for the purpose set forth.

CHARLES G. MAYER.

Witnesses:
C. C. J. GROHMANN,
RUDOLPH A. ROMEN.